(12) United States Patent
Posselius et al.

(10) Patent No.: US 9,699,968 B2
(45) Date of Patent: Jul. 11, 2017

(54) CALIBRATION OF A DISTANCE SENSOR ON AN AGRICULTURAL VEHICLE

(71) Applicants: John H. Posselius, Ephrata, PA (US); Pieter Vanysacker, Moere (BE); Didier Verhaeghe, Ypres (BE); Joachim Boydens, Zedelgem (BE)

(72) Inventors: John H. Posselius, Ephrata, PA (US); Pieter Vanysacker, Moere (BE); Didier Verhaeghe, Ypres (BE); Joachim Boydens, Zedelgem (BE)

(73) Assignee: CNH Industrial America LLC, New Holland, PA (US)

( * ) Notice: Subject to any disclaimer, the term of this patent is extended or adjusted under 35 U.S.C. 154(b) by 50 days.

(21) Appl. No.: 14/760,844

(22) PCT Filed: Jan. 14, 2014

(86) PCT No.: PCT/EP2014/050539
§ 371 (c)(1),
(2) Date: Jul. 14, 2015

(87) PCT Pub. No.: WO2014/108550
PCT Pub. Date: Jul. 17, 2014

(65) Prior Publication Data
US 2015/0354943 A1    Dec. 10, 2015

(30) Foreign Application Priority Data

Jan. 14, 2013 (BE) .................................. 2013/0020

(51) Int. Cl.
*A01D 41/00* (2006.01)
*A01D 41/127* (2006.01)
(Continued)

(52) U.S. Cl.
CPC ........ *A01D 41/1278* (2013.01); *A01B 69/008* (2013.01); *A01D 41/127* (2013.01); *A01F 15/08* (2013.01); *G01B 11/026* (2013.01)

(58) Field of Classification Search
CPC .............. A01D 41/1278; A01D 41/127; A01B 69/008; A01F 15/08; G01B 11/026
See application file for complete search history.

(56) References Cited

U.S. PATENT DOCUMENTS 5,530,548 A     6/1996  Campbell et al.
5,577,373 A *  11/1996  Panoushek ........... A01D 41/141
                                                            56/10.2 E
(Continued)

FOREIGN PATENT DOCUMENTS

CN      101722907 A     6/2010
EP         0786200 A2    7/1997
JP      2007261463 A    10/2007

*Primary Examiner* — Mary Cheung
(74) *Attorney, Agent, or Firm* — Patrick M. Sheldrake

(57) ABSTRACT

Calibrating a distance sensor on an agricultural vehicle provided for measuring the distance between the sensor and a set of points on a ground surface in front of the agricultural vehicle, includes: performing a reference measurement when the agricultural vehicle is standing on a paved and substantially flat ground surface; processing the results of the reference measurement to reference data for use as reference during further measurements; storing the reference data in a memory.

10 Claims, 2 Drawing Sheets

Figure 1:
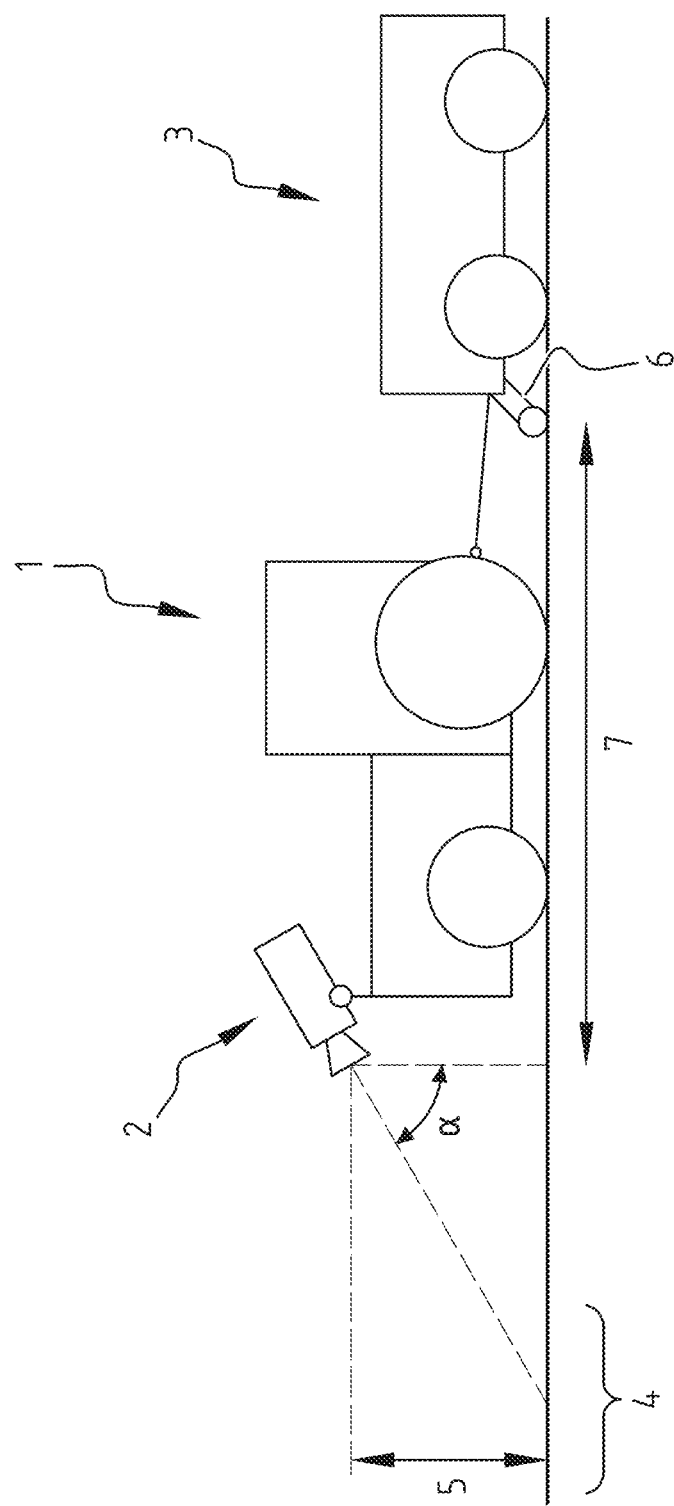

(51) Int. Cl.
    *A01F 15/08*     (2006.01)
    *G01B 11/02*     (2006.01)
    *A01B 69/04*     (2006.01)

(56) References Cited

U.S. PATENT DOCUMENTS

| | | | |
|---|---|---|---|
| 5,794,421 A * | 8/1998 | Maichle | A01B 63/114 |
| | | | 56/10.2 E |
| 5,984,420 A * | 11/1999 | Murray | E01C 19/00 |
| | | | 172/4.5 |
| 6,073,070 A * | 6/2000 | Diekhans | A01B 79/005 |
| | | | 180/167 |
| 7,844,378 B2 | 11/2010 | Lange | |
| 8,200,399 B2 | 6/2012 | Madsen | |
| 8,248,471 B2 | 8/2012 | Inui et al. | |
| 8,452,568 B2 | 5/2013 | Imanishi et al. | |
| 8,957,963 B2 | 2/2015 | Almeida et al. | |
| 9,121,146 B2 * | 9/2015 | Paulsen | G01B 11/00 |
| 2003/0184747 A1 * | 10/2003 | Diekhans | A01D 41/127 |
| | | | 342/123 |
| 2006/0045620 A1 * | 3/2006 | Olson | E01C 19/48 |
| | | | 404/84.1 |
| 2008/0152428 A1 * | 6/2008 | Berning | E01C 23/088 |
| | | | 404/84.1 |
| 2008/0177449 A1 * | 7/2008 | Pickett | A01D 41/141 |
| | | | 701/50 |
| 2010/0109422 A1 * | 5/2010 | Busley | B60G 3/01 |
| | | | 299/39.6 |
| 2012/0206575 A1 | 8/2012 | Massanell et al. | |

\* cited by examiner

CALIBRATION OF A DISTANCE SENSOR ON AN AGRICULTURAL VEHICLE

This application is the US National Stage filing of International Application Serial No. PCT/EP2014/050539 filed on Jan. 14, 2014 which claims priority to Belgian Application BE2013/0020 filed Jan. 14, 2013, each of which is incorporated herein by reference in its entirety.

The invention relates to an agricultural vehicle provided with a sensor which is connected to a control unit of the agricultural vehicle such that the agricultural vehicle can be controlled in at least partially automatic manner on the basis of a signal from the sensor.

Sensors are frequently used in agricultural vehicles for the purpose of adjusting settings which control the operation of the agricultural vehicle. A force sensor can for instance be provided in a baler in order to measure a pressure force. The position of movable wall parts of the baler is set or a speed of movement of the baler is set and/or modified on the basis of the measured pressure force.

A drawback of the known sensor systems for agricultural machines is their complexity. Several sensors are typically required to set one parameter. A further drawback is the operating speed, i.e. known measuring sensors typically measure a deviation from ideal operating characteristics in the agricultural machine, after which the agricultural machine is adjusted for the purpose of compensating this deviation. As a result a deviation from the ideal situation will always occur before settings of the agricultural machine can be adjusted.

It is an object of the invention to provide a simple sensor system for an agricultural vehicle.

The invention provides for this purpose an agricultural vehicle with a distance sensor directed at a ground surface in front of the agricultural vehicle such that the distance sensor is provided for the purpose of measuring the distance between the sensor and a set of points on the ground surface, wherein the distance sensor is connected to a control unit of the agricultural vehicle such that the agricultural vehicle can be controlled in at least partially automatic manner on the basis of a signal from the distance sensor.

Because the distance sensor is directed at a ground surface in front of the agricultural vehicle, information can be collected about this ground surface before the agricultural vehicle effectively comes into contact with this ground surface. Collecting information before the agricultural vehicle reaches the ground surface makes it possible to adjust settings of the agricultural vehicle on the basis of the collected information such that, at the moment that the agricultural vehicle reaches the ground surface, the settings of the agricultural vehicle have been adjusted so as to guarantee optimal operation of the agricultural vehicle on the ground surface. A correct analysis of the signals from the distance sensor has the result that the agricultural machine does not deviate, or at least less so, from its ideal operational configuration. As a result an agricultural machine can be configured so as to function more optimally via the distance sensor which measures a ground surface in front of the agricultural machine. Because the distance sensor is provided for the purpose of measuring a distance between the sensor and a set of points on the ground surface, information is obtained concerning a plurality of sub-zones of the ground surface in front of the agricultural vehicle. As a result the relation between the different individual measurement results (of the sub-zones) measured by the distance sensor can be analysed in order to extract further ground surface characteristics. It is thus possible for instance to determine a volume of the crop present on the ground surface in front of the agricultural vehicle. On the basis of this determined volume the agricultural vehicle can be set to move forward at a determined speed and in a determined direction (for instance the direction of the centre of gravity of the measured volume). Settings of an implement attached to the rear of the agricultural vehicle can also be adjusted here for optimal processing of the crop detected via the distance sensor.

The distance sensor is preferably a 3D camera. 3D cameras are known and typically used to form an image of objects in front of the camera, wherein a distance between camera and object is measured for each pixel of the image. Different types of 3D camera are known, including a stereo-vision camera system (wherein the distance is determined by comparing two images; similar to the depth of field of a person seeing through two eyes), time-of-flight camera (wherein the distance is determined by the period of time measured between the moment at which the camera emits a light signal and the moment at which the camera receives this light signal back in each pixel). These or other 3D cameras can be applied according to the invention.

The invention further relates to a method for calibrating a distance sensor which is placed on an agricultural vehicle and provided for the purpose of measuring the distance between the sensor and a set of points on a ground surface in front of the agricultural vehicle, wherein the method comprises the following steps of:

performing a reference measurement when the agricultural vehicle is standing on a paved and substantially flat ground surface;

processing the results of the reference measurement to reference data for use as reference during further measurements;

storing the reference data in a memory.

Acquiring a distance sensor such as a 3D camera involves a considerable investment cost. This camera is therefore preferably used on different agricultural vehicles. It can thus be placed on the combine harvester during harvesting, while some time later, during baling, the camera is placed on the tractor which draws the baler. The distance sensor does however have to be calibrated for each new application. The present invention provides for a simple calibrating method, whereby application of a distance sensor on an agricultural vehicle is economically feasible.

For a correct operation of a distance sensor the mounting height relative to the ground surface and the angle at which the distance sensor is placed relative to the ground surface are typically predetermined, or at least known. It is however inconvenient and time-consuming for a farmer to measure the exact height and angle of the camera via a measuring rule each time the distance sensor is placed on an agricultural vehicle.

Performing a reference measurement when the agricultural vehicle is on a paved, substantially flat ground surface and processing the results of the reference measurement provides a calibrating method which can be performed quickly and has a high reliability. The reference data can be stored in a memory for further use for automatic control of the agricultural vehicle.

The agricultural vehicle, or an implement attached to the rear of the agricultural vehicle, preferably has an inlet sensor, and the method comprises the further steps of:

moving the agricultural vehicle forward at a speed;

registering a first moment in time at which the distance sensor detects a predetermined pattern relative to the reference data via the distance sensor;

registering a second moment in time at which the inlet sensor measures a predetermined value;

determining a time period which is a difference between the first and second moments in time;

determining a distance by multiplying the time period by the speed;

storing said distance in the memory.

The distance between the inlet of the agricultural vehicle or the implement attached to the agricultural vehicle on the one hand and the ground surface measured by the distance sensor on the other can be determined in simple manner via this method. When this distance is known, and the speed of the agricultural vehicle is likewise known, it is possible to determine the time period between the measurement via the inlet sensor and the corresponding impact on the agricultural vehicle or implement. It is hereby possible to determine the exact moment at which settings of agricultural vehicle or implement have to be adjusted in order to keep the latter in its optimal operational state.

The step of processing the results preferably comprises of determining the height of the distance sensor relative to the flat ground surface. The step of processing the results more preferably comprises of determining the angular position of the distance sensor relative to the flat ground surface. The step of determining the distance more preferably comprises of determining a horizontal distance between the distance sensor and the inlet of the implement or agricultural vehicle on the basis of the time period, the height and the angular position. The height, angular position and distance to the inlet of agricultural vehicle or implement can be determined in simple manner and comprise all information necessary to make a correct interpretation of the measured values. Storage of these three reference values further does not require a very large memory.

The agricultural vehicle or implement preferably comprises an intensity sensor for measuring an operating intensity, and the method comprises the further steps of:

registering an operating intensity via the intensity sensor for a predetermined time period;

registering a pattern measured via the distance sensor during the time period;

determining a relation between the registered pattern and the operating intensity in order to perform an intensity calibration.

An intensity calibration allows adjustment of the settings of the agricultural vehicle and/or implement to the expected operating intensity (expected on the basis of the values measured by the distance sensor). Optimum operation of agricultural vehicle and/or implement can hereby be approximated with greater accuracy.

The method preferably comprises the following steps of:

detecting crops on the ground surface when the distance sensor measures a predetermined pattern;

determining the width and the centre of gravity of the crop on the ground surface on the basis of the measured pattern;

emitting a signal to the agricultural vehicle in order to control this latter.

Via this method the agricultural vehicle can be controlled automatically in the direction of the crop. Particularly during baling, wherein a swath, being a strip of crop material lying on a ground surface, is taken up by the baler for pressing, the centre of gravity of the swath can be determined by the distance sensor, after which the agricultural vehicle can be controlled in the direction of this centre of gravity so as to thus automatically follow the swath.

The invention will now be further described on the basis of an exemplary embodiment shown in the drawing.

Figure 2:
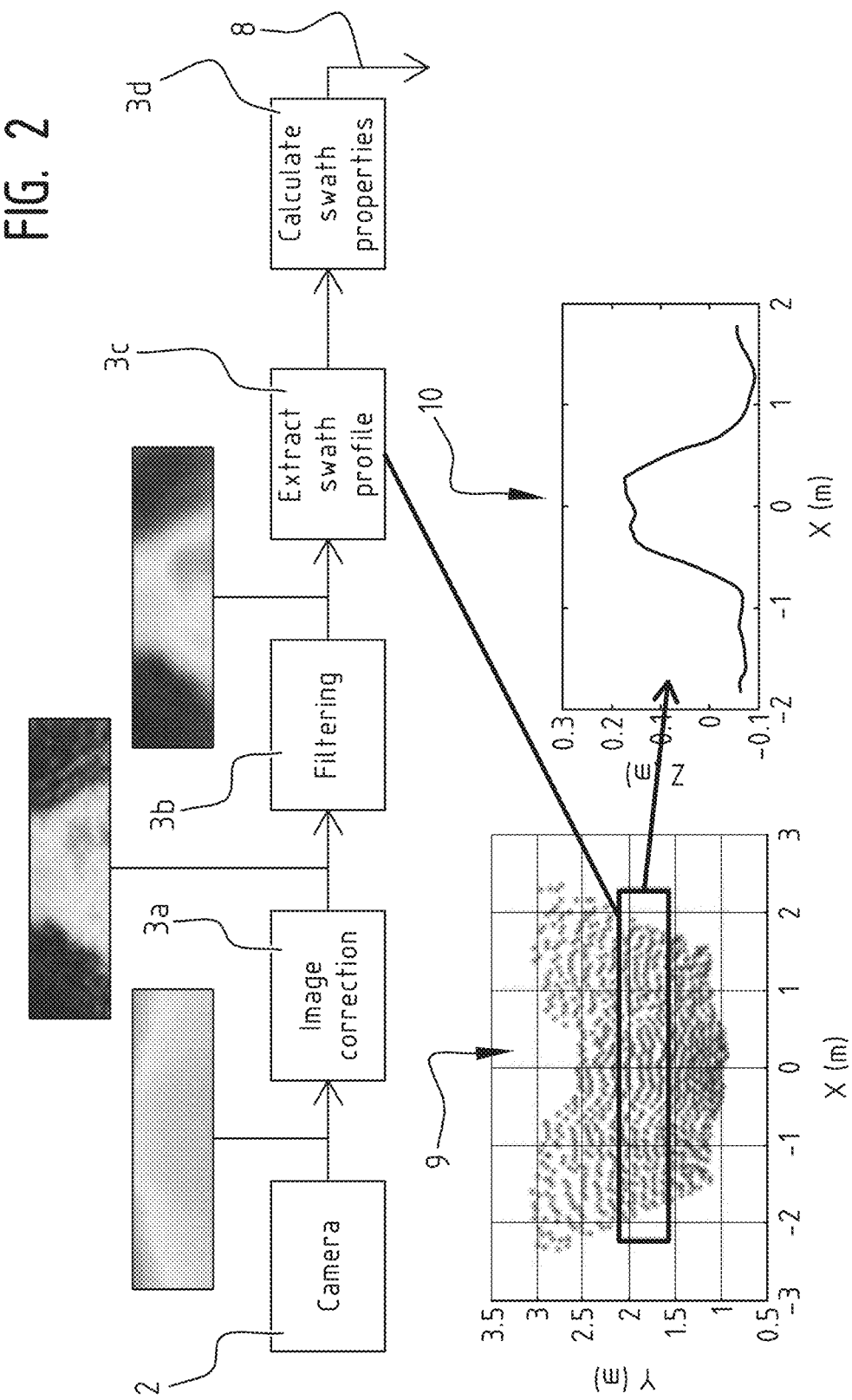

In the drawing:

FIG. 1 shows a schematic representation of an agricultural vehicle with distance sensor; and FIG. 2 shows an example of the processing of results from the distance sensor.

The same or similar elements are designated in the drawing with the same reference numeral.

FIG. 1 shows a tractor 1 connected to an implement 3. This implement 3 is for instance a baler. A 3D camera 2 is provided on tractor 1. 3D camera 2 is directed toward a ground surface 4 in front of tractor 1. 3D camera 2 is mounted at a height 5 relative to the ground surface and at an angle α relative to the perpendicular line from ground surface 4. There is further typically a distance 7 between camera 2 and an inlet 6 of implement 3.

3D camera 2 is provided to measure for each pixel a distance between camera 2 and ground surface 4. 3D cameras are known and can operate on different principles. 3D cameras are thus known which operate via stereo-vision. Time-of-flight 3D cameras are also known. It is irrelevant to the invention which technology is applied to measure distance between camera and ground surface. What is important however is that a distance can be measured between the camera and different sub-zones of ground surface 4. The scope of protection of the present invention is therefore limited not to 3D cameras, but to a distance sensor. It is noted in this context that a distance sensor which measures only a distance for each sub-zone, and not a light value (a camera typically measures a light value in black and white or colour), can likewise be applied according to the invention.

FIG. 1 shows a tractor 1 with a baler 3. The invention is however applicable to agricultural machines in general. Camera 2 can thus be placed on a combine harvester (not shown). In the case of a combine harvester the distance 7 between the inlet of the combine harvester on the one hand and the ground surface 4 on the other will be notably smaller than the distance 7 shown in FIG. 1, since the inlet of a combine harvester is located at the front of the vehicle. The operating principles of the invention are however likewise applicable to such a set-up. Further possible examples of cameras on an agricultural vehicle are seeding implements, ploughing implements or harrowing implements.

When tractor 1 of FIG. 1 moves forward at a speed, 3D camera 2 will measure a predetermined pattern. This predetermined pattern will depend on the work being carried out by the agricultural vehicle at that moment. In the case of the shown tractor 1 with baler 3, the predetermined pattern corresponds to that of a swath (elucidated in more detail below with reference to FIG. 2). When the 3D camera is mounted on the combine harvester, the camera will detect a crop. Because of the forward movement of tractor 1, the detected ground surface 4 will come to lie at the location of inlet 6 of baler 3 a predetermined time period later (this time period depending on the speed of advance of the tractor). At that moment the swath, which was detected one predetermined time period earlier by the 3D camera, is processed by baler 3.

Operating parameters of baler 3 depend on the mass of swath to be processed. Measuring the swath via the 3D camera before it arrives at the inlet 6 of baler 3 makes it possible to adjust operational settings of the baler so as to guarantee best possible operation thereof. A so-called feed-forward control mechanism is hereby created, wherein an advance assessment is made of the deviation from ideal operating conditions based on the results of the 3D camera, on the basis of which the settings of the baler are adjusted before a change in its operation can be detected in the baler.

The control of tractor 1 can further be coupled to 3D camera 2 so that tractor 1 is controlled automatically on the basis of the results of 3D camera 2. A swath, which is an elongate strip of crop lying on a ground surface, can thus be followed by controlling tractor 1 in the direction of the centre of gravity of the detected swath.

Similar operating principles and corresponding advantages are achieved by similar application of a 3D camera on another agricultural vehicle.

FIG. 2 shows an example of how data 2 measured by a 3D camera can be processed. Camera 2 is preferably connected to a processor able to perform different data processing functions. FIG. 2 thus shows how rough images from the camera first pass via an image correction step 3A and then through a filter 3B. A measurement pattern can be extracted from the corrected and filtered data in step 3C. From this pattern, which is designated in FIG. 2 with reference numeral 10, further properties can be calculated, on the basis of which the agricultural vehicle is adjusted. It is an object here to generate to the agricultural vehicle via 3D camera 2, after processing 3A, 3B, 3C and 3D, a signal 8 on the basis of which the agricultural vehicle can be adjusted. The method of adjusting the agricultural vehicle can be programmed here in different ways, including via controllers or via a look-up table, in which predetermined settings are defined for predetermined values of signal 8.

Reference numeral 9 in FIG. 2 designates a set of data measured by 3D camera 2. These results are measured via a 3D camera with 64×16 pixels (width and height respectively). Each pixel is shown in the figure as a dot, wherein the position of the dot in the graph corresponds to the position of the respectively measured sub-zone within ground surface 4. The V-shaped location of the outer pixels shows that the camera is placed at an angle α, whereby the lower row of pixels shows a narrower zone than the upper row of pixels of the 3D camera. The deformation of the dot pattern in the central zone of the figure further shows that the ground surface at the position of this central zone is higher than the ground surface at the sides. A cross-sectional profile can be determined herefrom as indicated in FIG. 2 with reference numeral 10. According to a preferred embodiment according to the invention, this distance measurement is combined with a light measurement, wherein the colour or light reflection intensity measured by the camera gives an indication of the material. A camera will thus detect a stronger light reflection in a central zone when a swath of straw is present there than at outer zones where there is soil. Combining light intensity measurement of a camera with 3D measurement of the 3D camera can produce improved results.

An example will be elucidated hereinbelow of how settings of an agricultural vehicle can be adjusted on the basis of the measured results of camera 2 so as to optimize operation of the agricultural machine. When an agricultural machine moves forward over a swath at a speed in order to take up and press this swath into bales via a baler 3, for optimal operation of the baler the quantity of crop material at the inlet of the baler is preferably constant over time. As shown in FIG. 2, camera 2 measures the properties of the swath and thus measures for instance the height of the swath and the width of the swath. In the figure the swath has a width of slightly less than 2 meters and a peak height of about 0.2 meter. When the 3D camera detects in further measurements of the swath that the swath is becoming smaller, for instance in that the measured height decreases from 0.2 meter to 0.15 or even 0.1 meter, the speed of the agricultural machine can be increased in order to maintain a constant quantity of swath at the location of inlet 6 of baler 3. Baler 3 can hereby continue to function optimally. As alternative to measuring the height of the swath, the surface area of the cross-section of the swath, as indicated with reference numeral 10, can be determined and used to maintain a constant quantity of swath at the location of the inlet of the baler.

Example 2

When a 3D camera detects a horizontal shift in the cross-section of the profile of the swath, as shown in FIG. 2 with reference numeral 10, the agricultural vehicle can be controlled so as to approach the swath centrally. This enables the baler to take up the swath at its inlet in balanced manner, preferably symmetrically over its width.

The invention further provides a method for calibrating 3D camera 2, particularly in order to allow easy change-over of the 3D camera from one agricultural machine to another agricultural machine or from a first application to a second application of an agricultural machine.

Once the camera has been placed on the agricultural vehicle, calibration of the 3D camera takes place by means of recording a reference image when the agricultural vehicle is standing on a flat ground surface. The flat ground surface is preferably paved, this guaranteeing the flatness of the ground surface. Paved does not necessarily mean here that the ground surface is asphalted or concreted, but that the surface has a sufficiently great hardness to prevent indentations resulting from a person walking over the surface. In order to perform the reference measurement the 3D camera or the processor coupled thereto preferably receives an initiation signal from the operator of the agricultural vehicle, the signal indicating that the agricultural vehicle is positioned on a flat ground surface. After this initiation signal has been received from the operator, the results of the reference measurement (being the results from the 3D camera at the moment that the 3D camera receives the signal from the operator) are read. These results are then processed to reference data which can be used as reference during further measurements of the 3D camera. These reference data are further stored in a memory.

A camera angle α and a height 5 can be determined from the reference measurement via mathematical algorithms. This height 5 and camera angle α can for instance be determined on the basis of the difference between the measured distance of the upper row of pixels relative to the measured distance of the lower row of pixels and the known angle of view of the camera. Further measurements via the 3D camera during operation of the agricultural vehicle can be analysed in relation to these reference data. As alternative to calculating a height 5 and a camera angle α, the individual measured values of each pixel or, as further alternative, the average measured values of each row of pixels, are stored in order to function as reference data.

The distance between the camera and the inlet of the agricultural vehicle or implement can be calibrated in the manner described below. The agricultural vehicle is moved forward at a speed s. The 3D camera records successive images of the ground surface in front of the agricultural vehicle with a high frequency. In this context a high frequency is a frequency of a minimum of 4 images per second, preferably a minimum of 8 images per second, more preferably 12 images per second, and preferably fewer than 50 images per second, more preferably fewer than 40 images per second, most preferably fewer than 30 images per second. The recorded images are analysed in order to detect a crop on the ground surface. A crop is detected in that a predetermined pattern is recognized via the 3D camera. FIG. 2 thus shows by way of example a predetermined pattern which indicates a swath. The moment in time at which the 3D camera first detects the predetermined pattern is registered. A second moment in time which follows the first moment in time and at which the inlet sensor of the agricultural vehicle or the implement measures a predetermined value, is likewise registered. This value is predetermined so that it is indicative of startup of operation of the implement. The difference between the second moment and the first moment in time provides a time period which indicates the time necessary before the detected crop arrives at the inlet of the implement when the agricultural vehicle advances at the speed s. By multiplying the speed (for instance in meters per second) by the determined time period (also in seconds for instance) a distance is obtained (for instance in meters) which indicates the distance between ground surface 4 and inlet 6 of the implement or agricultural vehicle. This distance can be used in the control of the agricultural vehicle or implement in order to determine the moment at which settings can best be changed after the 3D camera detects a change in the crop.

The camera system, which comprises 3D camera 2, data processing system 3 and the control unit of agricultural vehicle 8, can further be calibrated to control the operating intensity of the implement and/or the agricultural vehicle. Preferably performed for this purpose is an intensity calibration wherein the quantity of crop measured (for instance on the basis of the height and width from the analysis shown with reference numeral 10 in FIG. 2) is recorded over a determined time period, and wherein the corresponding operating intensity of implement and/or agricultural vehicle is recorded via an intensity sensor. These data can be used to find a correlation between the measurement data of the 3D camera on the one hand and the operating intensity of the implement and/or agricultural vehicle on the other. This correlation can be used in further steps to control optimal operation of implement and/or agricultural vehicle on the basis of the data from the 3D camera.

The above described embodiments and the shown figures are illustrative and serve only for a better understanding of the invention. The invention is not limited to the described embodiments. Different alternatives described in the text can be freely combined by a skilled person and developed in more detail to form an operational whole without departing from the essence of the invention. The scope of protection of the invention will therefore be defined solely by the claims.

The invention claimed is:

1. A method for calibrating a distance sensor on an agricultural vehicle for measuring the distance between the sensor and a set of points on a ground surface in front of the agricultural vehicle, wherein the method comprises the following steps:
    performing a reference measurement when the agricultural vehicle is standing on a paved and substantially flat ground surface;
    processing the results of the reference measurement to reference data for use as reference during further measurements;
    storing the reference data in a memory;
    detecting crops on the ground surface when the distance sensor measures a predetermined pattern;
    determining a width and centre of gravity of the crop on the ground surface on the basis of the measured pattern;
    emitting a signal to control the agricultural vehicle toward the centre of gravity.

2. The method as claimed in claim 1, wherein the distance sensor is a 3D camera directed at said ground surface so that each pixel can measure a distance to a point from the set.

3. The method as claimed in claim 1, wherein the step of processing the results comprises determining a height of the distance sensor relative to the flat ground surface.

4. The method as claimed in claim 1, wherein the step of processing the results comprises determining an angular position of the distance sensor relative to the flat ground surface.

5. The method of claim 1, wherein at least the majority of the steps are performed with a processing unit of an agricultural vehicle.

6. A method for calibrating distance sensor on an agricultural vehicle for measuring the distance between the sensor and a set of points on a ground surface in front of the agricultural vehicle, wherein the agricultural vehicle, or an implement attached to the rear of the agricultural vehicle, has an inlet sensor,
the method comprises the following steps:
    performing a reference measurement when the agricultural vehicle is standing on a paved and substantially flat ground surface;
    processing the results of the reference measurement to reference data for use as reference during further measurements;
    storing the reference data in a memory;
    moving the agricultural vehicle forward at a speed;
    registering a first moment in time at which the distance sensor detects a predetermined pattern relative to the reference data via the distance sensor;
    registering a second moment in time at which the inlet sensor measures a predetermined value;
    determining a time period which is a difference between the first and second moments in time;
    determining a distance by multiplying the time period by the speed;
    storing said distance in the memory.

7. The method as claimed in claim 6, wherein the step of determining the distance further comprises determining a horizontal distance between the distance sensor and the inlet of the agricultural vehicle or the implement on the basis of the time period, the height and the angular position.

8. The method as claimed in claim 6, wherein the agricultural vehicle or implement comprises an intensity sensor for measuring an operating intensity, and wherein the method comprises of:
    registering an operating intensity via the intensity sensor for a predetermined time period;
    registering a pattern measured via the distance sensor during said time period;
    determining a relation between the registered pattern and the operating intensity in order to perform an intensity calibration.

9. An agricultural vehicle comprising:
    a distance sensor directed at a ground surface in front of the agricultural vehicle, the distance sensor configured for measuring a distance between the sensor and a set of points on the ground surface, wherein the distance sensor is connected to a control unit of the agricultural vehicle such that the agricultural vehicle can be controlled in at least partially automatic manner on the basis of a signal from the distance sensor; and a processing unit programmed to:
  perform a reference measurement with the sensor when the agricultural vehicle is standing on a paved and substantially flat ground surface;
  process the results of the reference measurement to reference data for use as reference during further measurements;
  store the reference data in a memory;
  detecting crops on the ground surface when the distance sensor measures a predetermined pattern;
  determining a width and centre of gravity of the crop on the ground Surface on the basis of the measured pattern;
  emitting a signal to control the agricultural vehicle toward the centre of gravity of the swath.

10. An agricultural vehicle as claimed in claim 9, wherein the distance sensor is a 3D camera.

* * * * *